United States Patent [19]

Moore

[11] Patent Number: 4,816,810
[45] Date of Patent: Mar. 28, 1989

[54] REMOTE ACCEPTANCE SWITCH FOR COMPUTER MOUSE

[76] Inventor: Robert F. Moore, 157 Normandy Ln., Newport News, Va. 23606

[21] Appl. No.: 90,815

[22] Filed: Aug. 28, 1987

[51] Int. Cl.[4] .............................................. G09G 1/00
[52] U.S. Cl. .................................... 340/710; 340/706; 340/709; 273/148 B
[58] Field of Search .................... 340/706, 709, 710; 273/148 B, 1 E, DIG. 28; 74/471 XY; 178/18

[56] References Cited

U.S. PATENT DOCUMENTS

| | | |
|---|---|---|
| 3,835,464 | 9/1974 | Rider . |
| 3,854,131 | 12/1974 | Vanderheiden et al. ............ 340/710 |
| 4,022,969 | 5/1977 | McKinlay et al. ................... 340/710 |
| 4,193,119 | 3/1980 | Arase et al. ......................... 340/710 |
| 4,419,672 | 12/1983 | Hird . |
| 4,464,652 | 8/1984 | Lapson et al. . |
| 4,501,424 | 2/1985 | Stone et al. ..................... 273/148 B |
| 4,581,761 | 4/1986 | Ichinokawa et al. . |
| 4,588,187 | 5/1986 | Dell ..................................... 273/1 E |
| 4,595,070 | 6/1986 | Hodges . |
| 4,698,626 | 10/1987 | Sato et al. ........................... 340/710 |
| 4,736,191 | 4/1988 | Matzke et al. ...................... 340/710 |

Primary Examiner—John W. Caldwell, Sr.
Assistant Examiner—Mahmoud Fatahi-Yar
Attorney, Agent, or Firm—Griffin, Branigan & Butler

[57] ABSTRACT

An accessory (40) for a computer mouse (18) includes a multistrand accessory conductor (42) for transmitting location signals and acceptance signals having a first coupling (44) for coupling a first end of the conductor (42) to the coupling (26) of a computer mouse assembly (19) and a second coupling (46) for coupling a second end of the conductor (42) to a coupling (22) of a computer (10). The accessory further includes a remote acceptance switch (54) coupled to the strands of the multistrand accessory conductor including a hand-operated button (56) for producing an acceptance signal similar to the acceptance signal produced by an acceptance switch (38) of the computer mouse (18). Thus, a cursor location generated by movement of the computer mouse can be accepted in a memory of the computer either by activation of the mouse acceptance switch or the remote acceptance switch.

13 Claims, 1 Drawing Sheet

REMOTE ACCEPTANCE SWITCH FOR COMPUTER MOUSE

BACKGROUND OF THE INVENTION

This invention relates generally to the art of computers and more specifically to computer systems involving cursor control devices commonly known as computer mice.

Generally, a computer mouse is a small, box-like, device having an electro-mechanical location generator mounted therein for generating signals indicative of the movement of the mouse on a work surface. These signals are sent to a computer. For example, one presently popular computer mouse includes a hard elastic ball housed within and protruding through the bottom of a mouse housing which rolls across the work surface beneath the mouse housing when the mouse is moved. Electrical circuits within the mouse housing monitor rotations of the elastic ball to generate signals indicative of the changes in location of the mouse and these signals are sent to a computer.

Usually a computer mouse also includes a hand-actuated acceptance switch thereon which can be, and usually is, actuated by a button which is usually located on top of the mouse housing. Usually, the mouse is connected to the computer through a flexible electrical cable. With appropriate software in the computer, the location signals sent thereto by the mouse cause a cursor which shows up on a video display of the computer to move in accordance with movement of the mouse. Thus, the cursor is a video prompt which shows a computer user where he is working within a computer display and which is controlled by movement of the mouse on the work surface. When the computer user desires that the computer accept a particular location of the cursor into its memory to be used by the computer, he actuates the acceptance switch, usually a button on the mouse, with the same hand with which he is moving the mouse about. In a menu driven program, the mouse might be used to locate and select options from a menu. In a graphic program, however, the mouse is usually used to locate elements of a graphic display, such as the three points describing a triangle. When the mouse is used for producing a particular graphic display it is sometimes necessary to precisely place and accept the locations of the cursor. Placing the cursor and accepting particular locations thereof into the computer memory with a mouse is usually easy, but at times, such acceptance can be quite "tricky". This problem normally occurs when one is drawing fine details of a graphic display which require great accuracy. When the cursor is at a desired location it is usually difficult to prevent any movement of the mouse while pressing the acceptance button on the mouse. If the mouse does move while pressing the button, the cursor also moves and the wrong location is accepted by the computer, and this operation must then be deleted and repeated to obtain a desired accuracy. Sometimes it is necessary to repeat this procedure two or three times before an actual, finally-located, position has been accepted by the computer. Such a procedure is time consuming and quite annoying to the computer operator. Thus, it is an object of this invention to provide an accessory for a cursor control device, such as a computer mouse, which avoids any inadvertent movement of the device and cursor resulting from actuation of an acceptance switch on the device.

It is a further object of this invention to provide such an accessory for a computer mouse which is uncomplicated in structure and in use.

It is a further object of this invention to provide such an accessory for a computer mouse which can be added to a computer system in which a mouse and a computer already exist.

SUMMARY

According to principles of this invention, an accessory includes a separate acceptance switch which is not rigidly coupled to the mouse, but is electrically coupled in parallel with the acceptance switch of the computer mouse. With this accessory, a computer operator can use the mouse to properly locate a cursor and then either lightly hold the mouse in place or completely release it while using the remote acceptance switch to accept the cursor position in the computer memory. Operation of the remote acceptance switch does not cause inadvertent cursor movement.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENT

Figure 1:
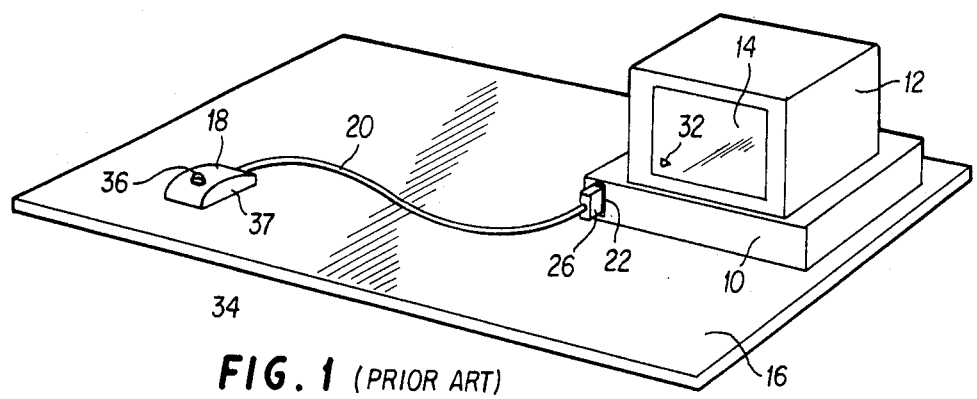
FIG. 1 is a front isometric view of a prior-art computer system with a mouse.
Figure 2:
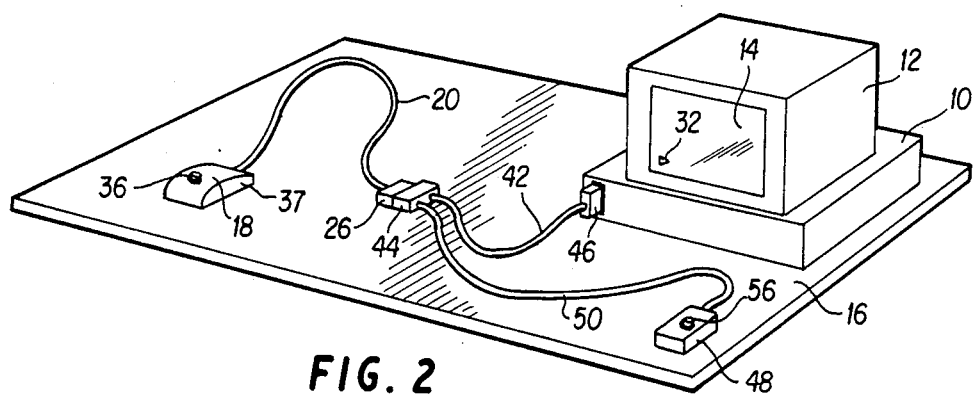
FIG. 2 is a front isometric view of a computer system including a computer mouse and a remote-acceptance switch accessory of this invention.
Figure 3:
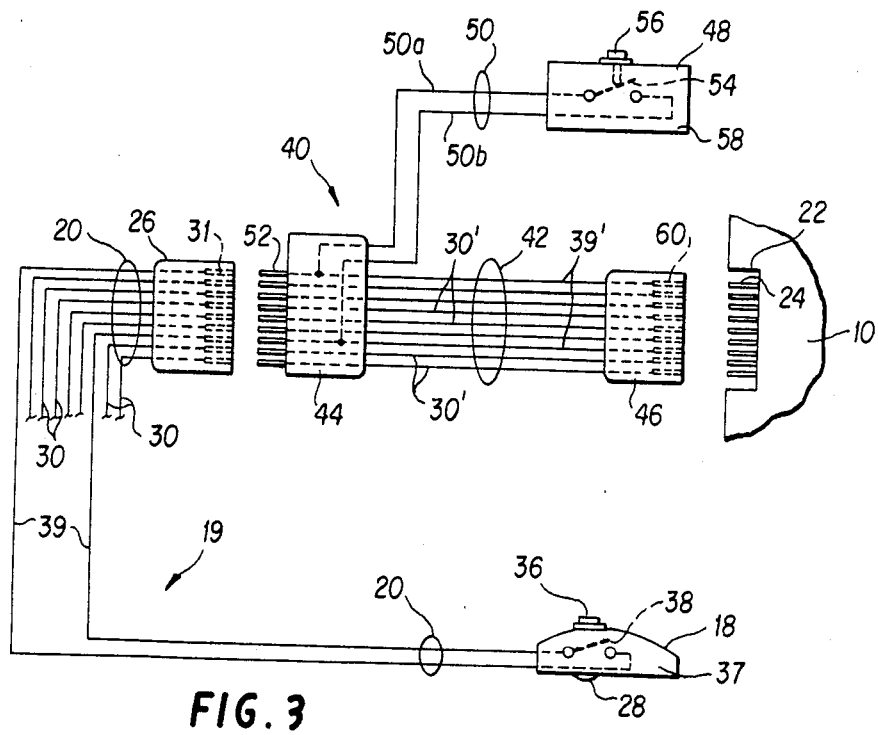
FIG. 3 is a block/schematic diagram of a computer-mouse remote acceptance switch accessory of this invention along with a portion of a computer and prior-art mouse circuitry.

Looking first at the prior-art embodiment of FIG. 1, a computer 10 having a monitor 12 with a screen 14 is used in conjunction with a work surface 16 and a computer mouse 18. The computer mouse 18 is an integral part of a computer mouse assembly 19 which also consists of a flexible multistrand cable 20 and a female coupler 26. The computer mouse assembly 19 is coupled to a computer port 22 by the female coupler 26. Although the male computer port 22 is shown at the front of the computer 10 for purposes of clarity, it will be understood that the port normally will not be at the front of the computer.

The prior art and the invention are described herein with reference to an Apple IIC computer, which is currently a rather popular personal computer, however, it will be understood that the invention could be used with any kind of computer with which a computer mouse is used.

In any event, the computer mouse 18 has an elastic ball 28 mounted within the bottom thereof to contact the work surface 16 when the mouse 18 is moved thereon and be thereby rolled as the mouse 18 is moved across the work surface 16. This elastic ball 28 is in contact with sensors (not shown) which sense its motion and send signals indicative of this motion along location strands 30 (corresponding to connectors 4, 5, 8, and 9 of the coupler 26) to corresponding pins 24 of the computer. In this respect, female pin connectors, or sockets, 31 of the mouse coupler 26 have the following functional designations for an Apple IIC:

| PIN CONNECTOR NUMBER | SIGNAL NAME | DESCRIPTION |
| --- | --- | --- |
| 1 | MOUSEID | Mouse identifier; when active, disables NE556 hand controller timer. |
| 2 | +5 V | Total current drain from this pin must not exceed 100 mA. |
| 3 | GND | System ground |
| 4 | X1 | Mouse X-direction indicator |
| 5 | X0 | Mouse X-movement interrupt |
| 6 |  | Mouse button |
| 7 | MSW | Mouse button |
| 8 | Y1 | Mouse Y-direction indicator |
| 9 | Y0 | Mouse Y-movement interrupt |

However, it should be understood that it would be possible to use the strands in completely different ways for other computers and combine various signals on single strands by multiplexing and the like. The computer 10 uses the information in these signals to move a cursor 32 displayed on the screen 14. That is, as the computer mouse 18 is moved to the left or right, the cursor 32 is respectively moved to the left or right. Similarly, as the computer mouse 18 is moved away from and toward edge 34 of the work surface 16, the cursor 32 is moved upwardly and downwardly on the screen 14. In this manner one can use the mouse 18 to draw lines on the screen 14 and/or to define critical graphic points on the screen. With regard to defining graphic points, for example, one can create a triangle by locating the cursor 32 at each of its three apexes and simultaneously have the computer 10 accept, or store, these locations for specific use in its memory. With regard to the computer 10 accepting locations of the cursor 32 in its memory, for special use, when the cursor is at a point whose location is to be accepted, the computer operator depresses an acceptance button 36 on top of a housing 37 of the computer mouse 18 with the same hand with which he is moving the computer mouse 18. When the button 36 is depressed, a normally-open mouse switch 38 is closed, thereby electrically shorting-out strands 39, corresponding to terminals 1 and 7 of the female coupler 26, of the multi-strand mouse cable 20. The computer 10 understands this shorting of strands 39 (corresponding to terminals 1 and 7) to mean that it should store the present location of the cursor 32, and it does so.

A problem arises when a computer operator attempts to define a rather detailed character by depressing the acceptance button 36 in that he usually moves the mouse 18 ever so slightly before the mouse acceptance switch 38 is actually closed and for this reason, he often does not get the computer 10 to accept the desired cursor location.

A computer mouse accessory 40 of this invention includes a multistrand conductor 42, a male accessory coupler 44 for coupling to the mouse female coupler 26, a female accessory coupler 46 for coupling to the male pins 24 of the computer port 22, a remote-acceptance switch assembly 48, and parallel remote acceptance switch lines 50. With regard to the multistrand conductor 42, it is relatively short and has nine strands therein corresponding to the strands of the multistrand mouse cable 20 (strands corresponding to terminals 1 and 7 being the strands which conduct the acceptance signal and which are herein referred to as the acceptance strands 39' and strands corresponding to terminals 4, 5, 8 and 9 being strands which conduct change-in-location signals and which are herein referred to as the location strands).

The male accesory coupler 44, in addition to receiving the location strands 30', the acceptance strands 39', and other miscellaneous strands, also receives a remote acceptance switch line 50 having strands 50a and 50b respectively and electrically couples these remote acceptance switch strands 50a and 50b to the acceptance strands 39' corresponding to pins 1 and 7 of the male accessory coupler 44. Pins 52 of the male accessory coupler 44 are identical in configuration to pins 24 of the computer port 22 so that either of these can couple with the mouse female coupler 26 in the same manner.

The remote acceptance switch lines 50a and 50b are connected to opposite sides of a remote acceptance switch 54 which is actuated by a button mounted on the outside of a remote acceptance switch housing 58. By depressing the button 56 the normally-open remote acceptance switch 54 is closed, thereby electrically shorting out acceptance strands 39' of the accessory 40. Thus, acceptance of a particular cursor 32 location can be signalled either with an acceptance button 36 mounted on the computer mouse 18 or by depressing the remote acceptance button 56 on the remote acceptance switch assembly 48.

In use of the accessory 40, the mouse female coupler 26 is removed from the computer port 22 and the female accessory coupler 46 is inserted into the computer port 22 so that its female sockets 60 receive the male pins 24 of the computer 10. Similarly, pins 52 of the male accessory 44 are inserted into female sockets 31 of the mouse female coupler 26. Thereafter, the computer mouse 18 is used in the normal way described above, that is by moving it about on the work surface 16 so that its elastic ball 28 produces signals indicative of computer-mouse location which are sent to the computer 10 along location strands 30 of the multistrand mouse cable 20 and 30' of the multistrand accessory conductor 42. These signals cause movement of the cursor 32 on the screen 14. When a computer operator wishes for the computer 10 to accept a particular cursor location in its memory for processing he has the choice of depressing either the mouse acceptance button 36 or the remote acceptance button 56. If a particular cursor location to be entered is critical the computer operator does not depress the mouse acceptance button 36 because in doing so he might jiggle the mouse and thereby change the cursor's location before this location can be accepted. Instead, he depresses the remote acceptance button 56 thereby maintaining the computer mouse 18 completely stationary such that its position is not changed and the correct location is therefore accepted by the computer. The computer operator normally will use the mouse acceptance button 36 because of the convenience of single-handed operation, however, he has the option of using the remote acceptance button 56 in critical situations.

Depending upon the software being used, the acceptance process can vary. With some software, the user simply presses and releases the acceptance button to define a particular point. With other software, the user presses the acceptance button to define an initial point. The user then holds the acceptance button depressed while he "drags" the cursor to a final position and releases the button. In this manner, the user can define the characteristics of a graphic object such as a line, rectangle, circle, etc. In either software situation, the computer operator has the option to use either the mouse acceptance button 36 or the remote acceptance button 56.

It can be appreciated by those skilled in the art that the remote acceptance switch accessory of this invention provides an extremely valuable tool to a computer user when he is preparing detailed graphics using a computer mouse. The remote acceptance switch allows the computer user the choice of either using the mouse acceptance button 36 when convenience is more desirable than accuracy or the remote acceptance button 56 when accuracy is more important than convenience.

While the invention has been particularly shown and described with reference to a preferred embodiment, it will be understood by those skilled in the art that various changes in form and detail may be made therein without departing from the spirit and scope of the invention. For example, although the multistrand accessory conductor 42 is shown to be a flexible cable, it is not necessary to this invention for the male and female accessory couplers 44 and 46 to be separated by a flexible member. In this regard, the female and male accessory couplers 44 and 46 could be made as one rigid piece. Further, rather than including a flexible remote acceptance switch line 50, it would be possible to place the remote acceptance switch 54 and button 56 directly on the male and/or female accessory couplers 44 and 46. Further, it would be possible to pass the multistrand conductor 42 through the outer wall of the remote acceptance switch housing 58, install the male accessory coupler 44 in the wall of the housing 58 and contain the strands 50a and 50b within the housing 58 so that the mouse female coupler 26 would be connected directly to the remote acceptance switch assembly 48. Further, it would be possible to incorporate the remote acceptance switch 54 into the design of a computer mouse assembly 19 by eliminating couplers 44 and 46 and conductor 42, and by connecting the strands 50a and 50b to the appropriate conductors 1 and 7 with such connections being made either within the coupler 26 or the mouse 18, and also it would be possible to make the connection of strands 50a and 50b to the computer mouse assembly 41 through a mating pair of two conductor couplers so that the remote acceptance switch conductor 50 can be easily detached from the computer mouse assembly 19. Further, it would be possible to connect strands 50a and 50b directly to acceptable strands within the cabinet of the computer. Such an arrangement could also include mating couplers so that the remote acceptance switch conductor can be easily detached from the computer. Also, it may be possible to use the accessory 40 with other types of computer cursor control devices which utilize a built-in acceptance switch, and if inadvertent movement of such cursor control devices creates a problem, the benefits to be derived therefrom will be similar and may be as important as those derived from using the accessory 40 with a mouse 18. Still further, it would be possible to use this invention with a mouse or other cursor control device which is not physically coupled to a computer but rather is coupled therewith with electromagnetic waves, infrared light, or the like. Also, the remote acceptance switch assembly 48 need not be physically attached to the acceptance strands 39' but could rather be attached thereto by electromagnetic waves or the like. In addition, the accessory is described herein for use with only one type of computer and mouse. It should be understood that the principles of this invention (a remote acceptance switch for a computer mouse) can be employed in other types of computer systems and that such other systems do not necessarily use shorting-type acceptance signals.

The embodiment of the invention in which an exclusive property or privilege are claimed are defined as follows:

1. A computer accessory to be used with a computer and a cursor control device, said cursor control device being of a type having a motion-sensor means for generating location signals indicative of changes in the location of a portion of said cursor control device relative to a work surface and furnishing these to said computer over an information channel flexibly coupling said cursor control device to said computer, said location signals causing movement of a cursor on a display of the computer, said cursor control device also being of a type having a hand-activated acceptance switch thereon to produce acceptance signals in response to hand activation thereof and furnishing these over said information channel to said computer, thereby indicating to the computer that it should accept the present location of the cursor-control-device portion into a memory thereof for special use, said computer accessory including:

a remote acceptance switch for said cursor control device including a hand-operated switch means for producing remote acceptance signals in response to hand actuations thereof, said remote acceptance switch being located remotely from said cursor control device and not being rigidly connected therewith;

a remote-acceptance channel means for coupling said remote acceptance switch to said information channel for transmitting said remote acceptance signals to said information channel;

whereby when movement of said portion of the cursor control device relative to said work surface causes a desired location of the cursor, the acceptance of this location into the computer's memory can be signaled to the computer either by hand activation of the acceptance switch on the cursor control device or by hand activation of the remote acceptance switch.

2. A computer accessory as in claim 1, wherein said information channel is formed of an information multistrand conductor.

3. A computer accessory as in claim 2, wherein said remote-acceptance channel means is formed of a parallel multistrand conductor having parallel strands connected in parallel with some strands of said information channel.

4. A computer accessory as in claim 3, wherein said remote-acceptance channel means is further formed of a series multistrand conductor having series strands connected in series with strands of said information multistrand conductor, said parallel strands being connected in parallel with some of said series strands.

5. A computer accessory as in claim 4, wherein said parallel multistrand conductor is long and flexible.

6. A computer accessory as in claim 5, wherein said series multistrand conductor is long and flexible.

7. A computer accessory as in claim 6, wherein said series multistrand conductor has a first easily-disengageable coupling means at a first end thereof for selectively coupling first ends of said series strands with strands of said information multistrand conductor coming from said cursor control device and a second easily-disengageable coupling means at a second end thereof for selectively coupling second ends of said series strands with a computer input port.

8. A computer accessory as in claim 7, wherein said parallel strands are hard wired to said series strands.

9. A computer accessory as in claim 4, wherein said series multistrand conductor has a first easily-disengageable coupling means at a first end thereof for selectively coupling first ends of said series strands with strands of said information multistrand conductor coming from said cursor control device and a second easily-disengageable coupling means at a second end thereof for selectively coupling second ends of said series strands with a computer input port.

10. A computer accessory as in claim 9, wherein said parallel strands are hard wired to said series strands.

11. A computer accessory as in claim 4, wherein said series multistrand conductor is long and flexible.

12. A computer accessory as in claim 11, wherein said series multistrand conductor has a first easily-disengageable coupling means at a first end thereof for selectively coupling first ends of said series strands with strands of said information multistrand conductor coming from said cursor control device and a second easily-disengageable coupling means at a second end thereof for selectively coupling second ends of said series strands with a computer input port.

13. A computer accessory as in claim 12, wherein said parallel strands are hard wired to said series strands.

* * * * *